2,960,342

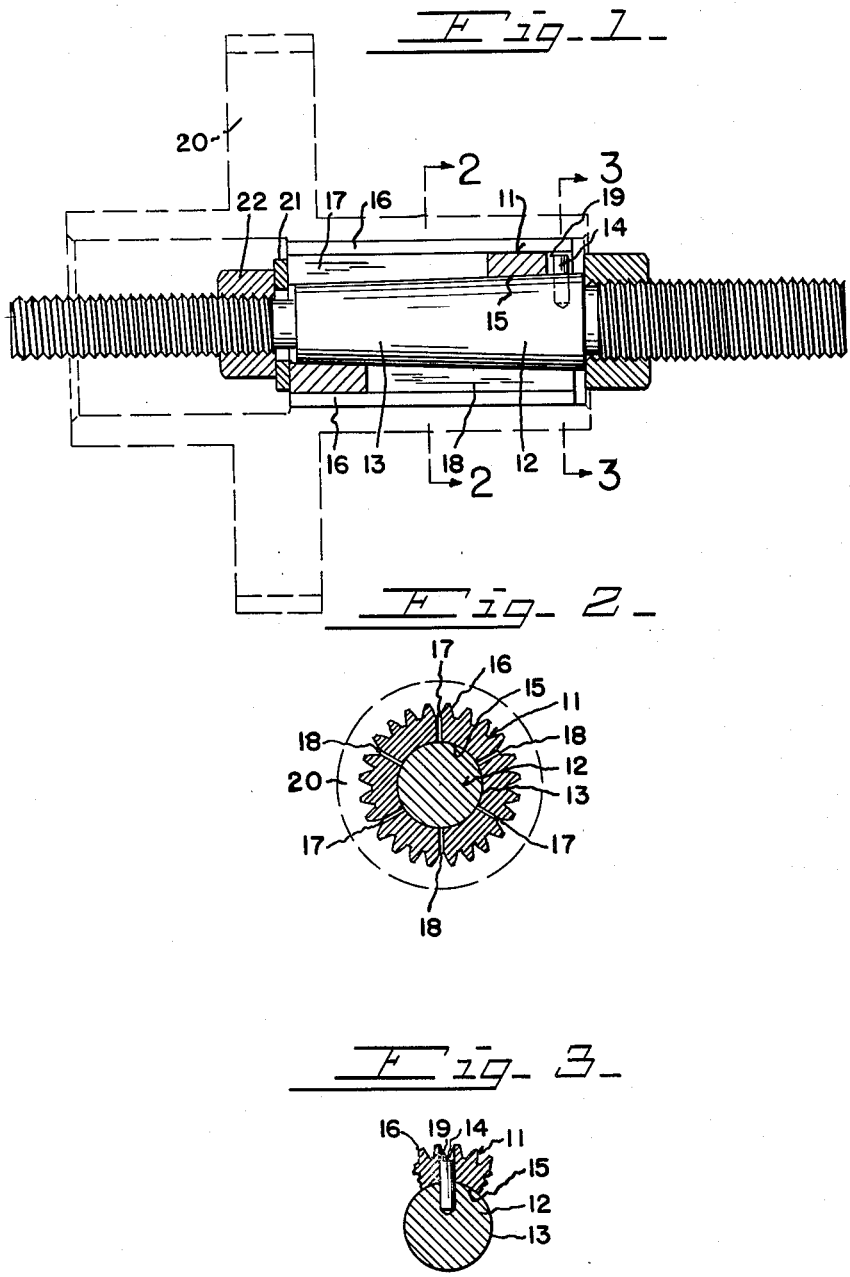

EXPANDABLE SPLINES

Foster W. Raper, 524 Philadelphia St., Covington, Ky.

Filed Mar. 28, 1958, Ser. No. 724,639

1 Claim. (Cl. 279—2)

In the manufacture of precision gears wherein the concentricity of the finished gear is of importance my improvement is of great value. At present the gears are cut, ground and a spline broached in the hub, however, as the gear is held during the various operations thereon at different points, the finished product leaves much to be desired.

With my improvement the spline is cut and ground in the gear blank, and from this operation on, all operations on the gear blank to the finished gear are performed using the spline as the locating point and when the gear is mounted on its spline connection, the gear runs true and concentric.

The object of my invention is to provide an expandable spline capable of being mounted on a tapered shaft and expanded to hold a gear blank in fixed position thereon.

A further object is to provide a spline hub with a tapered bore and a plurality of alternate slots extending from the ends of the spline approximately two-thirds of the length of the spline to permit uniform expansion of the spline.

A further object is to provide a vertical slot in the end of the spline hub for forming a fixed driving connection with a pin in the driving shaft.

My invention will be further readily understood from the following description and claim, and from the drawings, in which latter:

Fig. 1 is a sectional view of an arbor with my improved spline mounted thereon.

Fig. 2 is a cross-section of the same, taken in the plane of the line 2—2 of Fig. 1.

Fig. 3 is a detail section, taken in the plane of the line 3—3 of Fig. 1.

My improved spline 11 is arranged to be mounted on a suitable arbor 12. This arbor is shown for the purpose of showing one form of mounting, however the arbor will vary in its physical structure according to the type of work for which it is employed. The arbor has a tapered shank 13 and a projecting pin 14 extending from the enlarged end of the tapered shank to form a key for holding the spline 11 against rotation on the shank.

The spline 11 has a central tapered bore 15 and spline teeth 16 equally spaced about the outer periphery. Alternate slots 17 and 18 are cut at the base of the teeth and extend approximately two-thirds the length of the spline. In the present exemplification six slots are shown, three from one end and three from the other end. A vertical slot 19 is milled in the end of the spline to form a locking connection with the pin 14 to prevent rotation of the spline on the shaft.

One adaptation of my improved spline is for the purpose of machining a gear 20 from a gear blank. To process the gear, the spline is cut and broached in the gear blank after which my improved spline is inserted in the spline on the gear and by means of the washer 21 and the nut 22 the spline 11 is drawn up on the tapered shank 13 and as it is drawn up it expands in the spline on the gear for a tight fit between the gear and the spline. The pin 14 locks the spline against rotation.

All machining on the gear, such as cutting the teeth, grinding the teeth, grinding the centers on the gear hub and any other operations required to finish the gear are performed with the gear mounted on the expandable spline. Having machined the gear on the expanding spline, the gear when mounted on its spline will be concentric with the shaft and run true.

Having thus fully described my invention, what I claim as new, and desire to secure by Letters Patent, is:

In combination, a device for holding a gear blank for all operations thereon, a gear blank having spline teeth broached in the bore thereof, an expandable spline comprising a hub, teeth on the outer periphery of said hub mating with the spline teeth in the gear blank, a plurality of alternate slots in said hub extending from each end approximately two-thirds the length of said hub, a tapered arbor received in said bore, a pin extending from said arbor engaged in a slot in said hub, and nuts on the respective ends of said arbor of expanding said hub and locking said gear, spline hub and arbor in fixed relation to each other whereby all faces of said gear are exposed for machining.

References Cited in the file of this patent

UNITED STATES PATENTS

| | | |
|---|---|---|
| 2,469,873 | Ernest | May 10, 1949 |
| 2,612,376 | Wollner | Sept. 30, 1952 |
| 2,852,263 | Hohwart | Sept. 16, 1958 |
| 2,890,054 | Better | June 9, 1959 |